April 15, 1969     L. W. DAVIES     3,439,173
MOTION TRANSLATOR AND SELF-SYNCHRONOUS SYSTEM USING SAME
Filed Aug. 30, 1966

United States Patent Office 3,439,173
Patented Apr. 15, 1969

3,439,173
MOTION TRANSLATOR AND SELF-SYN-
CHRONOUS SYSTEM USING SAME
Louis Walter Davies, Roseville, near Sydney, New South
Wales, Australia, assignor to Amalgamated Wireless
(Australasia) Limited, Sydney, New South Wales,
Australia
Filed Aug. 30, 1966, Ser. No. 576,087
Claims priority, application Australia, Sept. 10, 1965,
63,868/65
Int. Cl. H01j *39/12*
U.S. Cl. 250—212                                    22 Claims

ABSTRACT OF THE DISCLOSURE

A motion translator comprising a photo-sensitive semiconductor device having an axis of rotation, at least three electrical contacts symmetrically disposed about said axis of rotation, and a single source of electromagnetic radiation adapted to excite said photo-sensitive device are disclosed. The source of radiation is provided with means to constrain said radiation into a beam impinging on a part of said semiconductor device. Means which vary the angular position of said beam about the axis of rotation relative to the arrangement of the electrical contacts are provided. The electrical contacts may be ohmic contacts or rectifying junctions. The relative magnitude of voltages developed between the electrical contacts provide an indication of the angular position of the beam relative to the axis. Self-synchronized systems using two or more of the translators are also disclosed.

---

Figure 1:
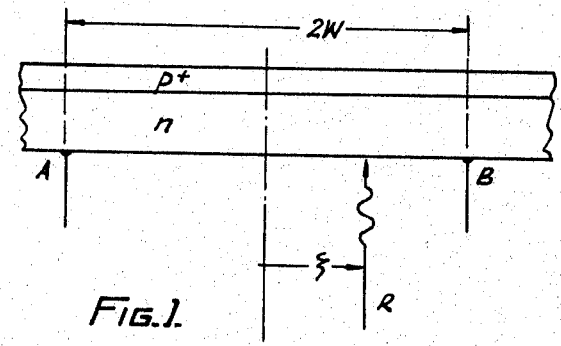

This invention relates to self-synchronous or repeater systems whereby angular motion or position at one point is translated to a remote point by electrical means and relates to a novel translator for use in such systems and to systems using such novel translators. The novel translator consists of a photosensitive semiconductor device, a cooperating source of electromagnetic radiation and means actuated by a drive shaft for varying the position or orientation of said source of electromagnetic radiation relative to said photosensitive semiconductor device whereby the electrical output of the said novel transistor provides an unambiguous indication of the angular position of the said drive shaft.

Self-synchronous or repeater systems are known, for example, under the trade name "Selsyn," in which one or more remote indicator or receiver rotors are constrained to follow the angular position of a transmitter rotor. Arrangements of this kind are commonly employed using rotating electrical machines in which the stators are provided with three-phase alternating-current windings and the rotors are provided with single-phase windings, or other suitable means using rotating electrical machines, and are well known. Resolvers for use with such systems are also known, based on similar machines and so arranged as to take up an angular position dependent on the resultant of two or more sets of angular position information supplied thereto.

The transmitter of such a system is variously alternatively referred to as the master or generator unit, whilst the receiver is similarly referred to as the slave or motor unit. The different names given to the two units are descriptive of their application only. In practice they can be and often are identical units. As a generic term the term "translator" will be used herein as indicative of a device which translates mechanical into electrical information or vice versa, and, unless otherwise indicated, will be held to mean a transmitter or a receiver or both as defined above.

In order to reduce the size and weight of such systems, systems other than that described above as based on rotating electrical machines have been devised and are known. For example, one self-synchronous system has been suggested in which in each translator the magnetic field of a transversely-magnetized rotor shaft interacts with two semiconducting Hall-effect generators placed in close proximity to the said shaft and disposed at a radial separation of 90°. The electrical output of the two Hall-effect generators gives an unambiguous indication of the angular position of the rotor of the transmitter unit. A servo system responsive to differences in the electrical outputs of the transmitter and receiver units constrains a similar arrangement of magnetized shaft and Hall-effect generators in the receiver so as to produce an output from the receiver identical with that of the transmitter, by rotating the shaft of the receiver to the one position at which this identity will hold.

It will be noted that this last system described requires the use of an external servo and drive system at the receiver location, as opposed to the more commonly known system using rotating electrical machines, wherein the receiver can and usually does drive itself into the corresponding position. It will also be noted, as is well known, that the positional accuracy of any such system can be improved by interposing suitable mechanical amplifiers, for example, gear trains, between the original motion and the transmitter unit, and between the receiver and the point at which the information is to be reproduced.

One object of this invention is to provide a novel translator of the type described having very small size and weight and requiring a very low power consumption as compared with conventional rotating electrical machines. It is a further object of this invention to provide a self-synchronous system using the novel translator and thus incorporating the advantages inherent in the novel device. It is a further object of this invention to provide a novel translator of the type described which is simple and comparatively cheap to manufacture, but which is at the same time sufficiently rugged as to be capable of satisfactory operation under extremely adverse conditions of acceleration, vibration and shock.

According to this invention, a novel translator of the type described for use in self-synchronous systems consists of an arrangement of semiconductor junctions disposed on or beneath the surface of a cylinder whose axis is the axis of rotation, or on or beneath a plane surface normal to the axis and a source of electromagnetic radiation adapted to excite said arrangement or part thereof, said source of electromagnetic radiation being optionally provided with means to constrain the said radiation into a beam and means to vary the angular position of the beam about the axis of rotation relative to the arrangement of semiconductor junctions, whereby the electrical output of the arrangement of semiconductor junctions provides an unambiguous indication of the angular position or direction of the said source or beam of electromagnetic radiation relative to the arrangement of semiconductor junctions.

Figure 4:
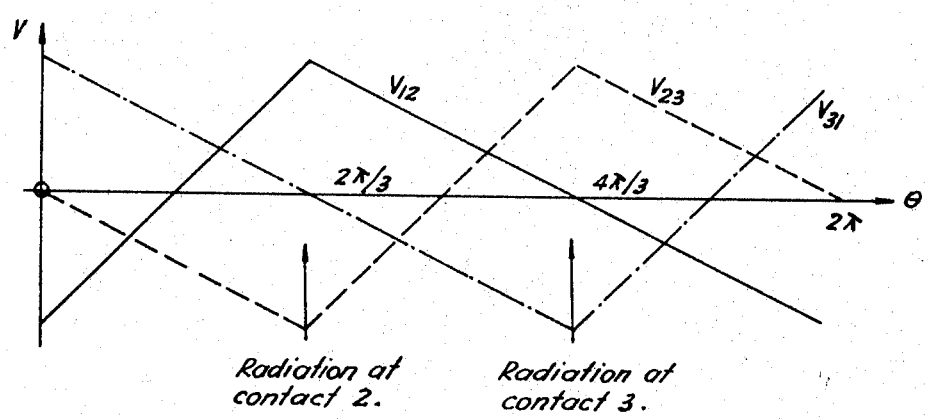
Figure 5:
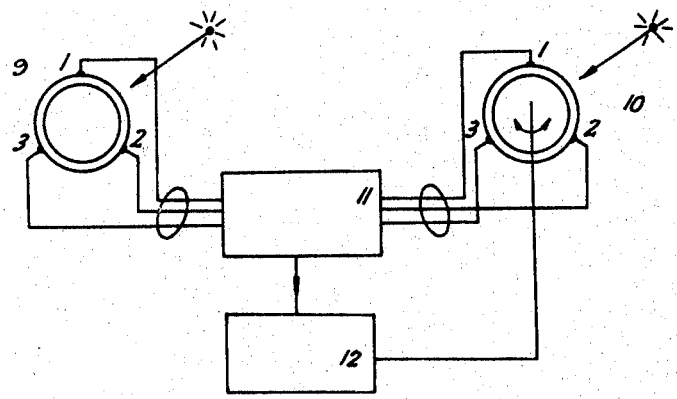
Figure 6:
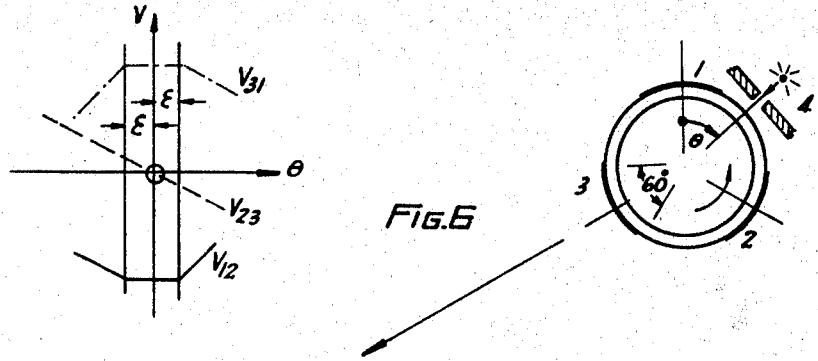

The invention will now be described in relation to the accompanying drawings. FIG. 1 shows a lateral photovoltaic device known per se which forms a basis for the description and explanation of the novel translator. FIGS. 2, 3, 8 and 10 show examples of novel translators according to the invention. FIGS. 4 and 9 show the relationship between the output voltages of two examples of the novel translator and angular motion imparted thereto. FIG. 5 shows in schematic form a self-synchronous system using two novel translators. FIG. 6 serves to illustrate the avoidance of ambiguity arising from finite width of contacts on the semi-conductor body, and FIG. 7 demonstrates a variation in which the same contacts are made very wide. Throughout the diagrams the same identifying numbers are used for similar parts.

FIG. 1 shows in diagrammatic form a known lateral photovoltaic device, the arrangement shown using a $p+-n$ junction configuration. Two non-rectifying line contacts A, B are provided on the n-layer spaced at a distance 2W. An imaginary line shown chain-dotted passes through the line midway between contacts A, B. An incident localised beam of electromagnetic radiation R falls on the device along a line identified by the co-ordinate $\xi$ and generates an electromotive force $V_{AB}$ ($V_{AB}=V_A-V_B$) between the two non-rectifying contacts A, B. The magnitude and polarity of the EMF $V_{AB}$ is dependent on the co-ordinate $\xi$ according to the expression $$V_{AB}(\xi) = -(kT/q)P_o \exp(-W/L_p) \sinh(\xi/L_p)$$
$$\simeq -\{(2kT/q)P_o \exp(-W/L_p)\}\xi/L_p$$

where the characteristic length $$L_p = (n_{o2}/p_{o2})^{1/2} L$$

is related to the diffusion length L for minority carriers in the n-type material by the factor $$(n_{o2}/p_{o2})^{1/2} = n_{o1}/n_i \gg 1$$

where:

$k$=Boltzmann's constant,
T=absolute temperature, degrees Kelvin,
$q$=the magnitude of the charge on an electron,
$P_o$=a quantity related to the excess hole density generated by the radiation R,
$L_p$=characteristic length,
L=diffusion length, and
$n_{o2}$, $p_{o2}$=equilibrium densities of electrons and holes respectively in the n-type material.

It is possible to fabricate a system in which there is to good approximation a linear relationship ($V_{AB}\alpha\xi$) between the output voltage $V_{AB}$ and the displacement $\xi$, which body is heavily-doped=p+-type material, on the order of 1 centimetre between the two non-rectifying contacts A, B. The same substantially linear relationship will also apply where the semiconductor body between the contacts A, B forms a curved or cylindrical surface; this fact is made use of in the novel translator now being described.

Figure 2:
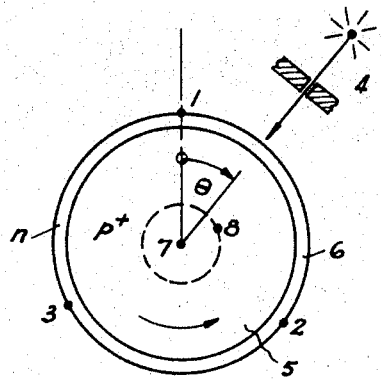

FIG. 2 shows one novel translator according to the invention, comprising a semiconductor body 5, part of which body is heavily-doped=p+-type material, on the outer surface of which is a layer 6 of n-type material having a thickness of the same order or less than the diffusion length for minority carriers in the said n-type material. The semiconductor body is preferably a right circular cylinder or cylindrical in shape and is symmetrically disposed about a common axis 7 of the novel device.

Three strip or "line" type non-rectifying contacts 1, 2, 3 are formed in this example on the outer surface of the n-type layer 6, these contacts lying parallel with the common axis 7 and being symmetrically disposed in this example around the semiconductor body 5 at 120° intervals. If required a non-rectifying contact may also be formed on the p-type material, here shown as a line-type contact 8 on the inside face of a hollow cylindrical body.

A source of electromagnetic radiation 4 is provided with a constraining aperture or lens system so arranged that only a narrow band or "line" of the semiconductor body is illuminated along a line parallel with the common axis 7. The photons emitted by the source 4 must have sufficient energy to create electron-hole pairs in the semiconductor body 5 of the device, that is, the photon energy must be at least equal to the band-gap energy of the semiconductor body. Suitable source of electro-magnetic radiation include filament lamps, semiconductor light sources and lasers. The novel device according to the invention may use any source to which a semiconductor body is responsive and the wavelength of the radiation is not restricted to the visible portion of the spectrum.

It will be clear that whilst the example shown in FIG. 2 shows a p+-type body provided with an n-type layer, the construction may be varied so as to use a heavily doped n-type body with an overlying p-type layer. Whilst the example shown in FIG. 2 shows the source of electromagnetic radiation 4 external to a cylindrical semiconductor body, it is also possible to use the arrangement shown in FIG. 3 wherein the layer 6 and the contacts 1, 2, 3 are placed on the inside of a cylindrical semiconductor body 5 and the source of electromagnetic radiation 4 and beam-forming arrangement are disposed inside the said cylindrical body. In the examples shown in FIGS. 2 and 3 means (not shown) are provided to allow rotation of one portion of the novel device about the common axis, so that either the source 4 and beam-forming arrangement are rotatable relative to the semiconductor body 5 or the semiconductor body 5 is rotatable relative to the source 4.

If now rotation is imparted to the novel device as so far explained, three output voltages will be obtained between adjacent pairs of the non-rectifying contacts 1, 2, 3, which output voltages will vary with the rotation. FIG. 4 shows three output voltages $V_{12}$, $V_{23}$, $V_{31}$ between the three symmetrically-disposed contacts 1, 2, 3 of FIG. 2 as a function of the angular position $\theta$ of the semiconductor body 5 relative to the source 4, the origin of $\theta$ being defined in FIG. 2 on the assumption that the semiconductor body is rotating relative to a fixed source. In this example, where a symmetrical arrangement of contacts is used, the sum of the three voltages will always be zero. FIG. 4 is assumed to commence at the point where contact 1 is exposed to the radiation source, points corresponding to the arrival of the other contacts under the radiation source being so indicated in the diagram. FIG. 4 shows that there is an un-ambiguous relationship between the values of any pair of the three output voltages $V_{12}$, $V_{23}$, $V_{31}$ and the angular position $\theta$.

FIG. 5 shows an example of the application of two novel translators 9, 10 according to the invention in a self-synchronous system employing an error detector 11 and a servo drive arrangement 12, it being assumed here that 9 represents the transmitter and 10 represents the receiver, the angular position of the rotor at 10 being required to correspond to that at 9. In this example the error detector 11 compares the outputs of each of the novel translators 9, 10 and in the known manner produces an error signal when the relative angular positions of the rotors in the translators 9, 10 are not identical, said error signal being used to actuate the servo drive system 12 which drives the receiver 10 until the said relative angular positions are the same and the error signal is reduced substantially to zero.

The apparent slight ambiguity which arises when the radiation falls on one of the contacts 1, 2, 3 when these have a finite angular width $2\epsilon$, as shown in FIG. 6, is in fact resolved because at least one of the three output voltages is monotonic as the contact in question passes through the radiation region. For example, when the radiation falls on contact 1, output voltages $V_{12}$ and $V_{31}$ are produced as shown in FIG. 6 which of themselves give ambiguous indications of $\theta$ since both voltages are constant over the angular width $2\epsilon$, that is, where $\theta$ is not greater than $2\epsilon$. It will be seen however that over the same angular width $2\epsilon$ the output voltage $V_{23}$ is an un-ambiguous function of $\theta$ so that, if the error detector and servo drive arrangement follow $V_{23}$ within this range of $\theta$, no ambiguity will arise.

Figure 7:
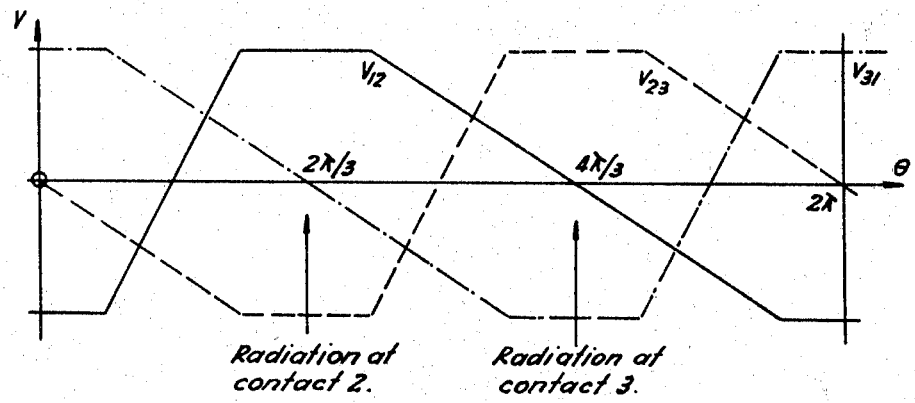

It may be advantageous in some applications to use configurations of contacts of chosen finite width from which, for a range of values of $\theta$, only one output voltage varies with $\theta$, whilst the others remain constant. This arrangement is not only un-ambiguous but an automatic choice can be made by the system itself of that output voltage which is relevant to the control for the particular value of θ concerned. An example of such a variation of the novel translator is shown in FIG. 7.

Figure 3:
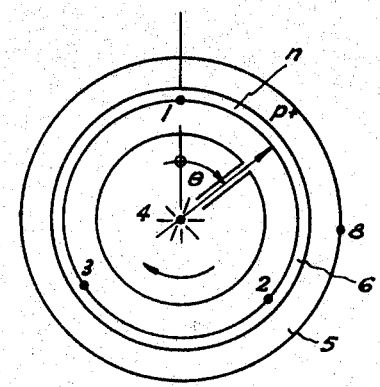
Figure 8:
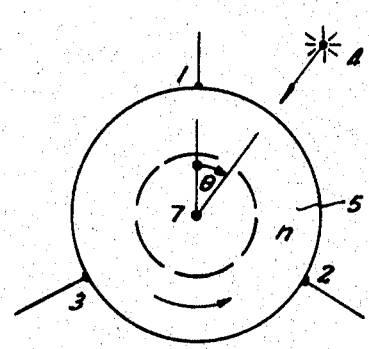
Figure 9:
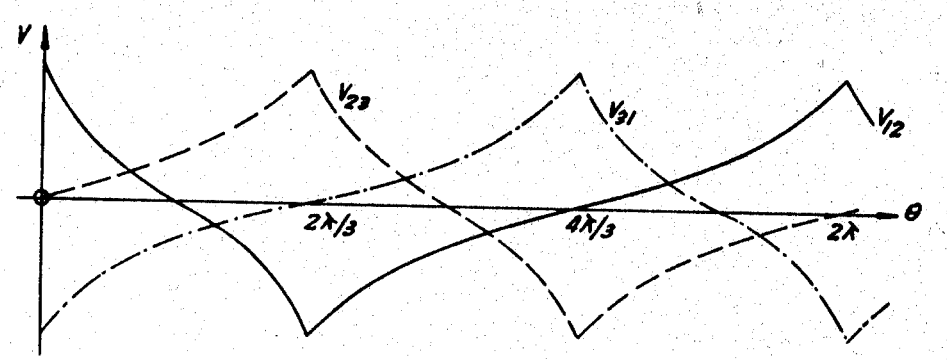

FIG. 8 shows a further novel translator according to the invention, wherein as an alternative to the use of the lateral photovoltaic effect employed in the examples of the invention described in relation to FIGS. 2 and 3, use is made of the difference in the photovoltages generated at two p-n junctions when the common n-type body in which they are formed is excited by electromagnetic radiation. The novel device shown in FIG. 8 consists of a cylindrical or annular n-type body 5 mounted on a shaft passing through a common axis 7 and rotatable with respect to a fixed source of electromagnetic radiation 4. Symmetrically disposed around the outer edge of the body 5 are three alloyed or diffused p-type regions 1, 2, 3. The basic operation of this example of a novel device according to the invention, the variations in material properties and variations in mechanical arrangement will all accord respectively with those already described in relation to the first example, so that no further explanation is necessary in this regard.

However, the linearity of the relationship between the output voltage and the angular displacement of the semiconductor body will not be as great in this example as in that first described. The relationship between the three output voltages and the angular displacement is typically shown in FIG. 9. The slight disadvantage with respect to linearity may in some cases be more than offset by the increased sensitivity attainable with the p-n junction contacts of FIG. 8.

Figure 10:
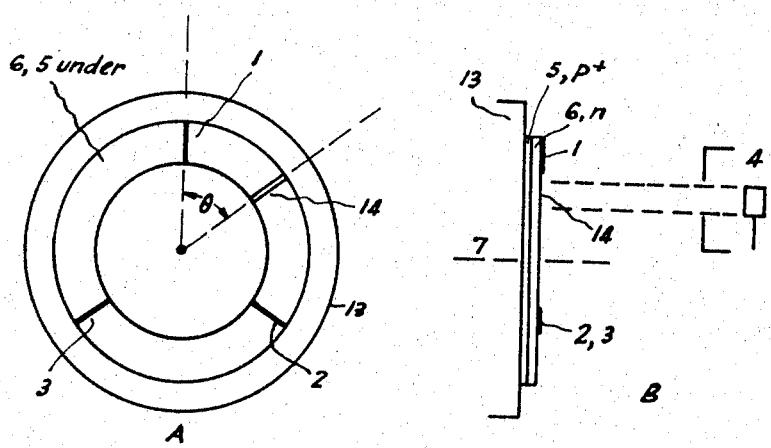

A further example of a novel translator according to the invention is shown in FIG. 10, and in this case the example is one in which the non-rectifying contacts or the p-n junctions as the case may be are disposed on a plane surface normal to the axis of rotation. FIG. 10A shows a planar semiconductor arrangement 5, 6 on which are disposed (in this example), three non-rectifying contacts 1, 2, 3, the whole being supported if necessary on a disc-shaped or other carrier 13. A point or strip area 14 is irradiated as previously described. FIG. 10B shows a side view of this example to afford further explanation of the general arrangement, and in which the radiation source 4 is also shown for completeness.

An advantage arises from the use of novel translators of the type described herein in self-synchronous systems in that the output of the source of electromagnetic radiation may be modulated at frequencies up to $\tau^{-1}$, where $\tau$ is the minority carrier lifetime in the semiconductor concerned. This allows the output signals of the novel devices to be amplified in a narrow-band amplifier tuned to the modulating frequency, thus improving the signal-to-noise ratio and tracking accuracy relative to that obtainable with direct current outputs. By way of example, an attractive solution would be a gallium-arsenide p-n junction source of infrared radiation which radiation may be either incoherent or coherent (laser) and modulated at up to 1,000 mHz. (1 gc.) used in conjunction with a silicon junction structure, in which structure the lifetime $\tau$ has been intentionally reduced to a value of approximately $10^{-9}$ seconds by known techniques.

Whilst the examples of the novel translators according to the invention so far described have been provided with three contacts or junctions symmetrically disposed on the semiconductor body, the invention is not restricted to this number and arrangement, as a number of contacts other than three and/or an alternative disposition of the contacts will be advantageous in some applications. Multiple translators corresponding to presently known units, for example, resolvers, can also be constructed according to this invention.

I claim:

1. A motion translator comprising, in combination, a photo-sensitive semiconductor device symmetrically disposed about an axis of rotation, at least three electrical contacts to said semiconductor device disposed about said axis of rotation, and a single source of electromagnetic radiation adapted to excite said photo-sensitive device, said source of radiation being provided with means to constrain said radiation into a beam, impinging on a part of said semiconductor device and means which vary the angular position of said beam about the axis of rotation relative to the arrangement of said electrical contacts and at a fixed distance from said axis whereby electrical outputs between pairs of the ararngement of contacts provide an un-ambiguous indication of the angular position of said beam of radiation relative to the arrangement of electrical contacts and said axis of rotation.

2. A motion translator according to claim 1, wherein said photo-sensitive semiconductor device comprises a first layer of heavily-doped semiconductor material of a first conductivity type, a second layer of semiconductor material of a second conductivity type, the thickness of the second layer being not gerater than the diffusion length of minority carriers in the semiconductor material of the second conductivity type, said three electrical contacts comprise three strip-like nonrectifying contacts applied to the second layer in a symmetrical disposition around the semiconductor device, and means for contacting the first layer.

3. A motion translator according to claim 1, wherein said photo-sensitive semiconductor device comprises a first layer of semiconductor material of a first conductivity type on which are formed three p-n junctions constituted by three areas of semiconductor material of a second conductivity type symmetrically disposed around the semiconductor device, said three areas being said three electrical connections.

4. A motion translator according to claim 1, wherein three electrical contacts are provided and said electrical outputs comprise three voltages taken between different ones of said electrical contacts and whose sum is zero and wherein the values of any two of said voltages bear an un-ambiguous relationship with said angular position.

5. A motion translator according to claim 1, wherein said electrical contacts of said photo-sensitive semiconductor device extend over three substantially equal angles symmetrically disposed relative to said axis of rotation such that during the application of rotational motion to the translator, one output voltage varies during transit of the radiation source over any of said three angles, whilst the other two voltages remain constant during this transit.

6. A motion translator according to claim 5, wherein said electrical outputs comprise three voltages, and wherein the values of any two of said voltages bear an un-ambiguous relationship with said angular position.

7. A motion translator according to claim 1, wherein said source of radiation is an incandescent lamp.

8. A motion translator according to claim 1, wherein said single source of radiation is a semiconductor device.

9. A motion translator according to claim 1, wherein said source of radiation is a laser.

10. A motion translator according to claim 1, wherein said source of radiation emits photons having sufficient energy to create electron-hole pairs in said photo-sensitive semiconductor device.

11. A motion translator according to claim 1, wherein said photo-sensitive semiconductor device is a solid right cylinder and the electrical contacts extend parallel with the axis of the cylindrical carrier.

12. A motion translator according to claim 1, wherein said photo-sensitive semiconductor device is applied to the outside of a carirer device of right circular cylindrical shape and the electrical contacts extend parallel with the axis of the cylindrical carrier.

13. A motion translator according to claim 1, wherein the photo-sensitive semiconductor device is applied to the inside of a carrier device of right circular cylindrical shape and the electrical contacts extend parallel with the axis of the cylindrical carrier.

14. A motion translator according to claim 1, wherein the photo-sensitive semiconductor device is of planar shape and is applied to a plane circular carrier normal to and having a common axis with the axis of rotation.

15. A motion translator according to claim 1, including means for modulating the source of radiation at a frequency up to $\tau^{-1}$ where $\tau$ is the minority carrier life in the semiconductor irradiated, and the outputs are voltages which may be fed to an amplifier tuned to said modulation frequency.

16. A motion translator according to claim 1, wherein the source of electromagnetic radiation comprises a gallium-arsenide p-n junction source of infra-red radiation and in which the lifetime of minority carriers in the photo-sensitive semiconductor device is low.

17. A motion translator according to claim 1, wherein the source of electromagnetic radiation is a coherent source of radiation and in which the lifetime of the minority carriers in the photo-sensitive semiconductor device is low.

18. A motion translator according to claim 1, including means for moving said source of electromagnetic radiation.

19. A motion translator according to claim 1, including means for moving said photo-sensitive semiconductor device.

20. A system including a first motion translator according to claim 1, wherein said first motion translator is adapted to function as a resolver by the addition of a second motion translator arranged to co-operate with a first motion translator, whereby two motion components may be applied to the resolver, one motion component to an element of the first motion translator and one motion component to an element of the second motion translator, and the electrical outputs of the resolver represent resolution of the two applied motion components.

21. A self-synchronous system comprising a plurality of motion translators according to claim 1 and further comprising means for applying motion to one of the motion translators, motors adapted to apply motion to the remaining of said plurality of motion translators, and amplifying means to receive the electrical outputs of the motion translators and responsive to inputs indicative of lack of synchronisation in the angular position relative to a reference of the rotating portions of the motion translators to actuate the motors and cause them to apply motion to the other motion translators in such direction and to such extent as to reduce the lack of synchronisation substantially to zero.

22. A motion translator comprising, in combination, a photo-sensitive semiconductor device having an axis, at least three electrical contacts spaced from and disposed about said axis, and a single source of electromagnetic radiation adapted to excite said photo-sensitive device, and source of radiation being provided with means to constrain said radiation into a beam, impinging on a part of said semiconductor device and means which vary only the angular position of said beam about the axis at a given linear distance therefrom relative to the arrangement of said electrical contacts whereby electrical outputs of the arrangement of contacts provides an un-ambigous indication of the angular position of said source or beam of radiation relative to the arrangement of electrical contacts.

References Cited

UNITED STATES PATENTS

| 3,193,744 | 7/1965 | Seward | 250—231 |
| 3,354,313 | 11/1967 | Lombard et al. | 250—211 |

RALPH G. NILSON, *Primary Examiner.*

MARTIN ABRAMSON, *Assistant Examiner.*

U.S. Cl. X.R.

250——211